US008555813B2

(12) United States Patent
Parks et al.

(10) Patent No.: US 8,555,813 B2
(45) Date of Patent: Oct. 15, 2013

(54) ANIMAL FEED/WATER DISPENSER WITH DUAL-USE INVERTIBLE BASE

(75) Inventors: Linda Parks, Napa, CA (US); Michael Dominic Risso, Napa, CA (US)

(73) Assignee: Lixit Corporation, Napa, CA (US)

( * ) Notice: Subject to any disclaimer, the term of this patent is extended or adjusted under 35 U.S.C. 154(b) by 323 days.

(21) Appl. No.: 12/928,018

(22) Filed: Nov. 30, 2010

(65) Prior Publication Data

US 2012/0132144 A1 May 31, 2012

(51) Int. Cl.
*A01K 5/00* (2006.01)
*A01K 7/00* (2006.01)

(52) U.S. Cl.
USPC .................................. 119/51.5; 119/51.01

(58) Field of Classification Search
USPC .................. 119/51.01, 51.5, 52.1, 53, 53.5
See application file for complete search history.

(56) References Cited

U.S. PATENT DOCUMENTS

| 3,720,184 | A | * | 3/1973 | Pearce | 119/51.5 |
|---|---|---|---|---|---|
| 4,034,715 | A | * | 7/1977 | Arner | 119/51.5 |
| 4,134,365 | A | * | 1/1979 | Futers et al. | 119/51.5 |
| 4,270,490 | A | * | 6/1981 | Kopp | 119/61.5 |
| 4,573,434 | A | * | 3/1986 | Gardner | 119/77 |
| 4,840,143 | A | * | 6/1989 | Simon | 119/52.1 |
| 5,259,336 | A | * | 11/1993 | Clark | 119/51.5 |
| 5,488,927 | A | * | 2/1996 | Lorenzana et al. | 119/51.5 |
| 5,699,753 | A | * | 12/1997 | Aldridge, III | 119/52.1 |
| 5,752,464 | A | * | 5/1998 | King et al. | 119/63 |
| 6,378,460 | B1 | | 4/2002 | Skurdalsvold et al. | |
| 6,467,428 | B1 | * | 10/2002 | Andrisin et al. | 119/51.5 |
| 6,863,025 | B2 | | 3/2005 | Ness | |
| 7,040,249 | B1 | | 5/2006 | Mushen | |
| 7,219,623 | B2 | | 5/2007 | Flowers et al. | |
| 7,487,741 | B2 | * | 2/2009 | Jordan | 119/61.54 |
| 2010/0122660 | A1 | | 5/2010 | Willett | |

* cited by examiner

*Primary Examiner* — David Parsley
(74) *Attorney, Agent, or Firm* — Howard Cohen

(57) ABSTRACT

An animal food/water dispensing apparatus provides a base that is invertible for alternative use as a water bowl or a feed bowl in conjunction with a single reservoir container design that is adapted to supply either water or feed to the base, so that a minimum of components are required to assemble an animal waterer or animal feeder. Each face of the base has a container mounting ring and a water trough or feed basin for presenting the flowable material from the reservoir container.

19 Claims, 3 Drawing Sheets

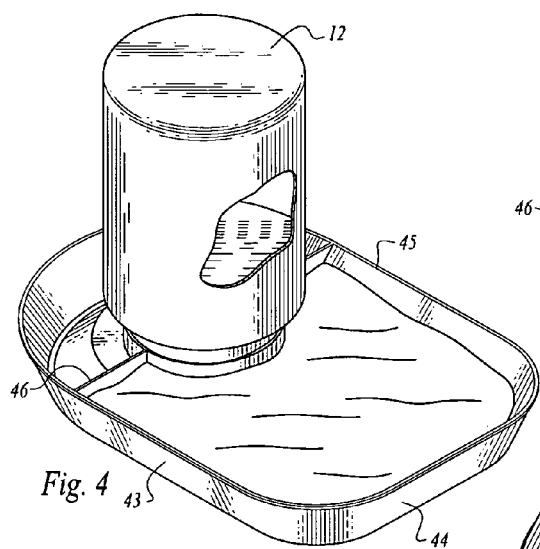
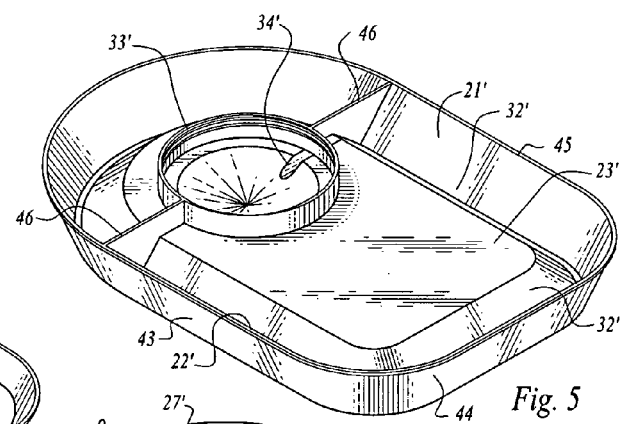
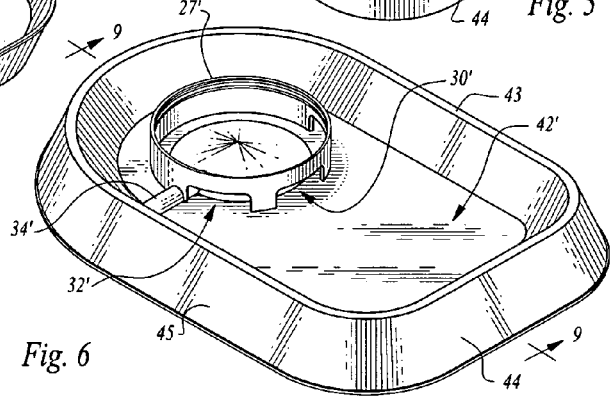
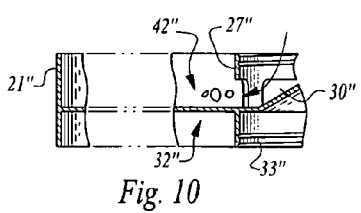

ANIMAL FEED/WATER DISPENSER WITH DUAL-USE INVERTIBLE BASE

CROSS-REFERENCE TO RELATED APPLICATIONS

Not applicable.

FEDERALLY SPONSORED RESEARCH

Not applicable.

SEQUENCE LISTING, ETC ON CD

Not applicable.

BACKGROUND OF THE INVENTION

1. Field of the Invention

This invention relates to apparatus for feeding and watering animals, including domestic fowl, domestic pets, small livestock, and the like. More particularly, it concerns feeding and watering apparatus that provide a reservoir container supplying an attached, supporting bowl or dish and relying on gravital flow to dispense the feed or water and maintain a supply level in the bowl or dish. For example only, see U.S. Pat. No. D393,108, issued Mar. 31, 1998.

2. Description of Related Art

In the care of animals, the most fundamental tasks are to provide food and water to sustain the animals. The prior art is replete with apparatus for delivering foodstuffs to domestic animals and pets, and for supplying water for drinking. Generally, feed dispensers provide some form of reservoir container that is inverted and connected to a bowl or dish, so that gravital flow will incrementally dispense the feed and maintain a supply level in the bowl for a period of time. One well-known type of water dispenser provides a liquid reservoir that is inverted to open into a drinking bowl, the liquid level in the bowl establishing a dynamic balance between the hydrostatic pressure within the liquid reservoir and the aerostatic pressure acting on the surface of the liquid within the bowl. The water is discharged incrementally from the reservoir so that a water supply may be presented in the bowl for an extended period of time.

Each type of apparatus, whether animal feeder or animal waterer, is typically designed as an assembly of unique components, each bowl and reservoir container being shaped to fit with its mating components. As a result, each apparatus requires the design and production and warehousing and tracking of a number of parts, and these undertakings comprise a hidden business expense that is nonetheless a burden for any business. Therefore, it is useful for a business to reduce the number of components it must manufacture and store.

There have been some modest efforts in the prior art to simplify the components of pet feeder apparatus. Generally, these efforts have focused on the provision and use of a common reservoir container to supply different bowls, whether for compact shipping purposes or to enable interchangeability for cleaning purposes. The bowl component is typically designed and manufactured for a single purpose: water supply or feed supply.

BRIEF SUMMARY OF THE INVENTION

The present invention generally comprises an animal food/water dispensing apparatus that provides a greatly simplified assembly of components to deliver either food or water an animal. A salient aspect of the invention is the provision of a base that is designed for dual use as a water bowl or a feed bowl. The base is invertible to present in upward facing fashion either of two dissimilar faces: one face provides a support for an inverted liquid reservoir container and an annular trough from which an animal may drink, and the other face provides a support for an inverted feed reservoir container and a basin-like coffer to receive the feed in incremental flow via gravital force. Thus the base is adapted for either function, and may be turned upside down to select the function by presenting the appropriate face directed upwardly. In this way a single base component may take the place of two previous components, simplifying manufacturing and storing of the apparatus.

A further salient feature of the base of the invention is that it is formed of thin-wall plastic or resin, requiring a minimum of material, and the opposite sides of the walls serve the differing purposes of the opposite ends of the base. For example, the V shape created by two of the side walls defines, when upwardly opening, the annular trough for drinking; when inverted to open downwardly, the V shape forms the periphery of the basin that holds the feed.

In a further aspect, the invention employs a reservoir container that may be used for either feed or water. Use of a single component for both purposes once again simplifies manufacturing, assembly, and storing of parts.

More specifically, the base of the invention is comprised of a first sidewall extending in a closed curve about a longitudinal axis of symmetry and disposed obliquely thereto, one continuous outer edge of the first sidewall being a free edge disposed in a first plane. A second sidewall is disposed concentrically within the first sidewall, with an outer edge of the second sidewall joined to the inner edge of the first sidewall in a V configuration. A central web spans the inner edge of the second sidewall and extends generally transverse to the longitudinal axis. The central web has two surfaces: a first face adjacent to the V configuration of the first and second sidewalls, and a second face that, when opening upwardly, forms, with the second sidewall, a basin that is adapted to hold liquid. Secured to the first face of the central web is a first ring extending coaxially and having a mounting feature for releasably securing an inverted reservoir container supplying water to the adjacent V configuration which comprises an annular trough from which an animal may drink. A second reservoir mounting ring is secured coaxially to the second face of the central web by a plurality of short legs. The second ring secures an inverted reservoir container holding a flowable feed product, and the spacing defined by the legs between the support ring and the central web provides space for the feed product to discharge incrementally from the reservoir and fill the basin.

BRIEF DESCRIPTION OF THE DRAWING

FIG. 4 is a perspective view of a further embodiment of the invention, shown assembled and oriented in the water dispensing orientation.

FIG. 5 is a perspective view of the base of the animal feed/water dispenser of FIG. 4, shown in the water dispensing orientation.

FIG. 6 is a perspective view of the base of the animal feed/water dispenser of FIG. 4, shown in the feed dispensing orientation.

FIG. 10 is an enlarged cross-sectional partial elevation of the sidewall and central web of a further embodiment of the invention.

DETAILED DESCRIPTION OF THE INVENTION

The present invention generally comprises an animal food/water dispensing apparatus that provides a greatly simplified assembly of components to deliver either food or water to an animal. A significant aspect of the invention is the provision of a base that is designed to be invertible for alternative use as a water bowl or a feed bowl. Likewise, the invention provides a single reservoir container design that is adapted to supply either water or feed to the base, so that a minimum of components are required to assemble an animal waterer or animal feeder.

Figure 1:
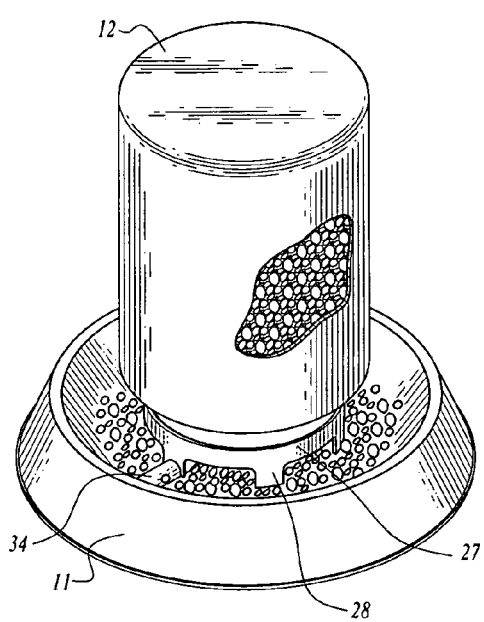
FIG. 1 is a perspective elevation of one embodiment of the animal feed/water dispenser featuring the dual-use invertible base of the present invention.
Figure 2:
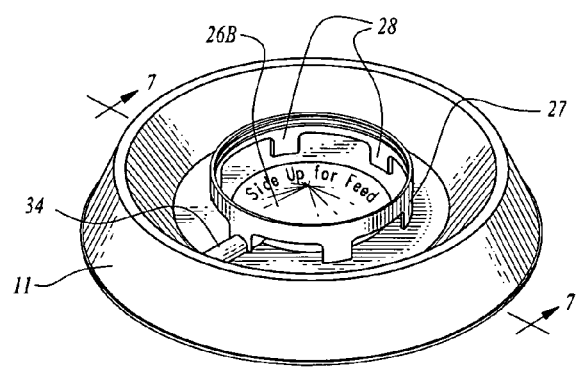
FIG. 2 is a perspective view of the base of the animal feed/water dispenser of the invention, shown in the feed dispensing orientation.
Figure 3:
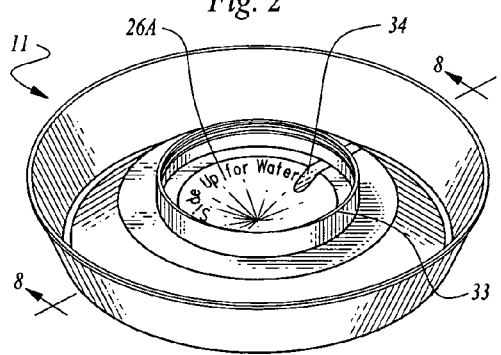
FIG. 3 is a perspective view of the base of the animal feed/water dispenser of the invention, shown in the water dispensing orientation.

With regard to FIGS. 1-3, one embodiment of the invention is composed of two components: a base 11 and a reservoir container 12. The container 12 comprises generally a wide mouth jar or bottle that is adapted to be inverted and supported by the base to provide either water or feed to the base (in FIG. 1 the container 12 is supplying feed to the base).

Figure 7:
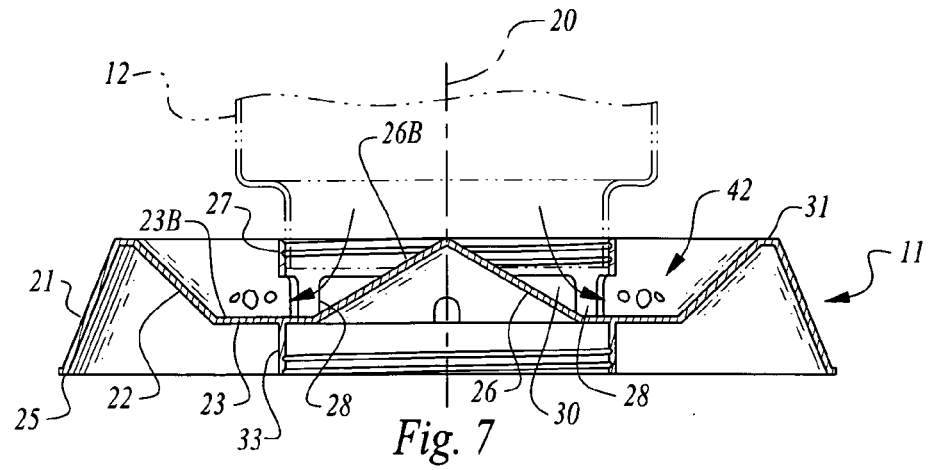
FIG. 7 is a cross-sectional elevation of the base of the first embodiment, taken along line 7-7 of FIG. 3 and inverted to show the feed dispensing orientation.
Figure 8:
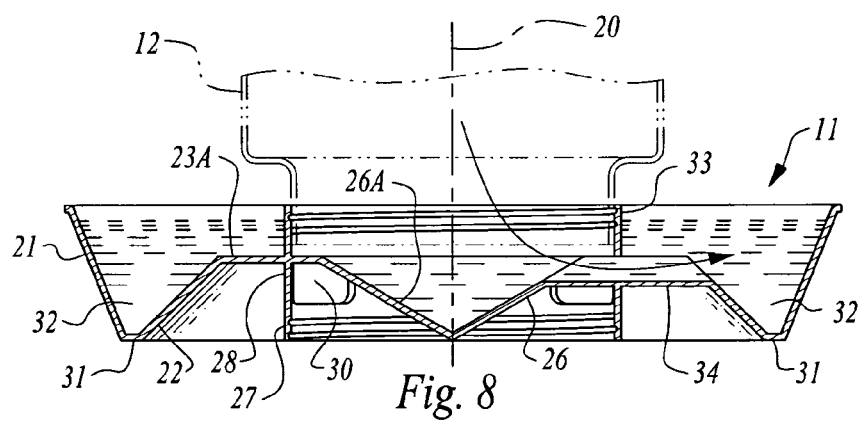
FIG. 8 is a cross-sectional elevation of the base of the first embodiment, taken along line 8-8 of FIG. 2 and inverted to show the water dispensing orientation.
Figure 9:
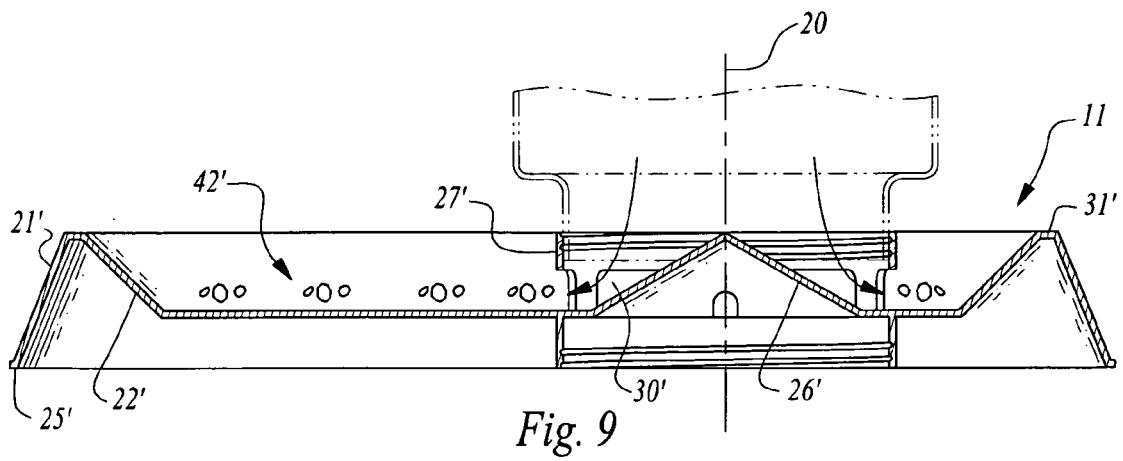
FIG. 9 is a cross-sectional elevation of the base of the second embodiment, taken along line 9-9 of FIG. 6.

With reference to FIGS. 7 and 8, the base 11 is formed of thin-walled portions of plastic, resin, or polymer materials, the thin-walled portions having opposed faces that provide distinctly different functions. A first sidewall 21 is formed in a closed curve about an axis of symmetry 20, the sidewall being oblique to the axis 20. One continuous outer edge 25 of the sidewall 21 is a free edge that extends in a first nominal plane. Disposed concentrically within the sidewall 21 is a second sidewall 22, and an outer edge of sidewall 22 is joined to the inner edge of sidewall 21 to form an apex that defines an annular land 31. The included angle between the sidewalls 21 and 22 defines a V configuration that forms a annular trough 32 when the base is disposed in the watering orientation, as will be explained below.

Disposed within the second sidewall 22 is a central web 23 extending generally transversely to the axis 20. The web 23 is joined to the inner edge of the sidewall 22 in continuous fashion, spanning the inner edge. Note that due to the fact that the sidewall 22 has a shorter axial extent than the outer sidewall 21, the inner edge of sidewall 22 supports the central web 23 in a position intermediate the plane of the outer edge 25 and the annular land 31. The central web is provided with a shallow conical protrusion 26 that is symmetrical with axis 20. As shown in FIG. 7, the conical projection serves to spread radially the feed dispensed from the reservoir container 12. The central web has two surfaces: a first face 23A (FIG. 8) adjacent to the V trough 32 of the first and second sidewalls, and a second face 23B (FIG. 7) that, when facing upwardly, forms, with the second sidewall, a basin 42 that is adapted to hold granular or flowable feed products (grains, seeds, kibbles, and the like).

Secured to the first face 23A of the central web is a first ring 33 aligned coaxially and having a mounting feature for releasably securing the mouth of the inverted reservoir container 12. In the preferred embodiment the mounting feature is an interior annular threaded surface that engages a complementary threaded annular exterior surface extending about the mouth of the container 12. However, other mounting expedients, such as bayonet mount, press fit, gasket mount or the like may be used. With particular regard to FIG. 8, the base 11 further is provided with a rib 34 extending generally radially from a point within the perimeter of the ring 33 to a point intersecting the sidewall 22. The rib 34 is a hollow channel that establishes flow communications between the interior of the container 12 and the annular trough 32, thereby supplying water to the adjacent trough as it is consumed.

Secured to the second face 23B of the central web is a second ring 27 aligned coaxially and having the same mounting feature as mounting ring 33 for releasably securing the inverted reservoir container 12. Note that the ring 27 is secured to the face 23B by a plurality of legs 28 spaced evenly about the ring to define openings 30 between the ring 27 and the face 23B that enable the movement of a flowable animal feed product from the interior of the container 12 to the basin 42. That movement is aided by the conical protrusion 26B which deflects the downward gravital flow to a radially outward path, as indicated by the dotted line arrows in FIG. 7.

It should be noted that, as shown in FIGS. 7 and 8, the axial length of ring 33 is sufficient so that it extends to be approximately flush with the nominal plane of the outer free edge 25 of sidewall 21. Likewise, the axial length of ring 27 is sufficient so that it extends to be generally flush with the plane in which the annular land surface 31 is disposed. Given the coaxial alignments of the rings 27 and 33, it is clear in FIGS. 7 and 8 that when one face of the base 11 is pointed downwardly in the ground-engaging position, the aligned rings transfer the weight load from the uppermost ring 27 or 33, which is supporting the container 12, to the lowermost ring 33 or 27, respectively, which is in the ground-engaging position. This arrangement reduces weight load and strain on the base assembly, extending its durability and longevity.

With regard to FIGS. 4-6 and 9, there is illustrated a further embodiment of the invention that is similar in many aspects to the previous embodiment, and similar components are labeled with the same reference numerals having a prime (') designation. This embodiment is designed to be suitable for domestic pets and the like, and employs the same arrangement of sidewalls 21' and 22' and the central web 23' supporting the mounting rings 27' and 33'. As shown in FIGS. 4-6, a salient change in this embodiment is that approximately 180° of the sidewall structures have been extended from their previous axial symmetry to form three linear sidewall portions 43, 44, and 45. These sidewall portions are arrayed in a rectangular configuration with large radius rounded corners. Indeed, an interior wall 46 extends diametrically from ring 33' to the adjacent surfaces of sidewalls 21 and 22, forming a closed rectangular configuration with sidewall portions 43-45. Thus the trough 32' is no longer annular; rather, it extends within the confines of sidewall portions 43-46 in the V opening of sidewalls 21' and 22'. Note that the radial rib 34' extends from within the ring 33' to the trough 32', so that the water from reservoir container 12 is directed into the rectangular portion, and excluded from the annular portion of the trough. The central web 23' extends as before to span the sidewall portions 43-45 and define a leakproof pan. This arrangement provides a larger watering trough that is more appropriate for domestic pets.

With regard to FIG. 10, a further embodiment of the invention employs a minimalist design to achieve the desirable features of the two-sided base assembly, and components corresponding to previously described parts are accorded the same reference numeral with a double prime (") designation. The outer sidewall 21" is oriented to extend transversely to the central web 23", the inner sidewall is eliminated, and the central web is joined at its periphery to the inner surface of the sidewall 21" Note that the central web is spaced unequally in the longitudinal direction, whereby the central web and sidewall 21" form a basin 42" for granular feed products that are delivered from a reservoir container secured to support 27". In the inverted disposition, the annular trough is eliminated and the sidewall 21" and web 23" form a liquid basin 32" to contain and present water that is supplied by a reservoir container secured to support 33". This embodiment provides the same two-sided dual functionality using a minimum of materials while providing a high value, innovative product.

In the feed dispensing orientation of FIG. 6, the basin 42'is significantly larger than the previous embodiment, whereby more feed may be presented to the animals being cared for, and there is more space for an animal such as a dog or cat to eat comfortably. Note that the openings 30' for the feed are located about the ring 27' so that they discharge only into the basin 42', not into the annular trough portion.

In the preferred embodiment, some desirable but not necessarily required geometric relationships have been shown. For example, the plane in which free edge 25 is disposed is generally parallel to the plane in which annular land 31 is located. The size of the openings 30 or 30' is dimensioned empirically to enable sufficient flow of feed to keep the basin supplied. As indicated partially in FIG. 2, the surface 26B of the conical protrusion (adjacent to surface 23B) may be embossed or imprinted with the legend "This side up for feed." Likewise, the surface 26A may display the legend "This side up for water" (FIG. 3), so that a new user of the apparatus cannot be confused by the one choice available: which face of the base should be assembled to the reservoir container.

Thus it may be appreciated that the invention provides an animal feeding apparatus in which two components, a base and a reservoir container, may be assembled to create either a feed dispenser or a water dispenser, and that the reduction in the number of components leads to economies of scale in manufacturing and inventory of parts. Furthermore, the same kind of economies are realized in the retail field, where proprietors need stock far fewer items in order to fill the need for watering and feeding apparatus, and the task of re-ordering parts is also greatly simplified.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. An apparatus for dispensing feed or water to an animal, including:
a base assembly and a reservoir container adapted to be releasably secured to said base assembly;
said base assembly including a base having first and second faces on obverse sides of said base;
said reservoir container comprising a closed container having an opening with a mouth;
first means extending from said first face and capable of supporting said container by releasably engaging said mouth with said container inverted;
second means extending from said second face and capable of supporting said container by releasably engaging said mouth with said container inverted;
said base being movable from a first assembly position in which said first face is directed upwardly and said inverted container is secured to said first means and said second face is in ground engagement to support said apparatus, to a second assembly position in which said second face is directed upwardly and said inverted container is secured to said second means and said first face is in ground engagement to support said apparatus.

2. The apparatus of claim 1, wherein said first face includes a first recessed area for receiving flowable material from said mouth of said inverted container and presenting the flowable material to animals being cared for, when said apparatus is in said first assembly position.

3. The apparatus of claim 2, wherein said flowable material comprises water, and said first recessed area comprises an peripheral trough generally surrounding and extending below said inverted container in said first assembly position.

4. The apparatus of claim 3, wherein said second face includes a second recessed area for receiving flowable material from said mouth of said inverted container and presenting the flowable material to animals being cared for, when said apparatus is in said second assembly position.

5. The apparatus of claim 4, wherein said flowable material comprises a granular feed product, and said second recessed area comprises a central basin generally surrounding and extending below said inverted container in said second assembly position.

6. The apparatus of claim 5, wherein said peripheral trough extends about and forms the perimeter of said central basin.

7. The apparatus of claim 4, wherein said peripheral trough is comprised of a first sidewall extending in a closed curve about a longitudinal axis, and a second sidewall disposed adjacently and concentrically within said first sidewall, said first and second sidewalls extending from a common apex surface in a V configuration.

8. The apparatus of claim 7, wherein said second sidewall includes an inner peripheral edge, and further including a central web extending to span said inner peripheral edge to form a bottom surface of said second recessed area in said second face.

9. The apparatus of claim 1, wherein said first means extending from said first face comprises a first ring having a mounting feature for releasably securing said mouth of said container.

10. The apparatus of claim 9, wherein said second means extending from said second face comprises a second ring having said mounting feature for releasably securing said mouth of said container.

11. The apparatus of claim 10, wherein said first and second rings are aligned about a common longitudinal axis of symmetry, said first and second rings extending in opposite directions along said axis.

12. The apparatus of claim 11, wherein each of said first and second rings is substantially flush with the outermost axial extent of said first and second faces of said base, whereby said first or second ring forms a portion of said ground engagement when said apparatus is in said second or first assembly position, respectively.

13. The apparatus of claim 8, wherein said first means comprises a first ring secured to said central web, said second means comprises a second ring secured to said central web, aid first and second rings extending from said central web in opposite directions.

14. The apparatus of claim 13, wherein said first and second rings are aligned about a common longitudinal axis of symmetry.

15. The apparatus of claim 14, further including a plurality of leg members secured between said second ring and said central web to define a plurality of openings therebetween that permit incremental flow of a flowable material from said inverted container into said second recessed area.

16. The apparatus of claim 2, wherein said base includes an outer sidewall having a closed curved configuration, and a central web spanning said outer sidewall and joined to an inner surface thereof, said central web being spaced between said first and second faces of said base assembly.

17. The apparatus of claim 16, wherein said first recessed area is a coffer defined within said inner surface of said outer sidewall and a first surface of said central web which is contiguous with said inner surface of said outer sidewall.

18. The apparatus of claim 17, wherein said second face includes a second recessed area for receiving flowable material from said mouth of said inverted container and presenting the flowable material to animals being cared for, when said apparatus is in said second assembly position.

19. The apparatus of claim 18, wherein said second recessed area is a coffer defined within said inner surface of said outer sidewall and a second surface of said central web which is contiguous with said inner surface of said outer sidewall.

\* \* \* \* \*